United States Patent [19]

Bruni

[11] 4,359,230
[45] Nov. 16, 1982

[54] PISTON RING WITH WEAR RESISTANT COATING

[75] Inventor: Ludovico Bruni, Turin, Italy

[73] Assignee: Associated Engineering Italy S.p.A., Turin, Italy

[21] Appl. No.: 292,127

[22] Filed: Aug. 11, 1981

Related U.S. Application Data

[62] Division of Ser. No. 12,820, Feb. 16, 1979, abandoned.

[30] Foreign Application Priority Data

Feb. 16, 1978 [GB] United Kingdom ............... 6114/78

[51] Int. Cl.³ .............................. F16J 9/20; F16J 9/22
[52] U.S. Cl. .................................... 277/216; 277/224; 277/235 A
[58] Field of Search ......... 277/216, 223, 224, DIG. 6, 277/235 R, 235 A, 236

[56] References Cited

U.S. PATENT DOCUMENTS

| 2,614,899 | 10/1952 | Phillips | 277/235 A X |
| 2,905,512 | 9/1959 | Auderson | 277/224 X |
| 3,583,713 | 6/1971 | Sugahara | 277/235 A |

FOREIGN PATENT DOCUMENTS

| 761049 | 12/1933 | France | 277/216 |
| 1057570 | 2/1967 | United Kingdom | 277/235 A |

Primary Examiner—Robert S. Ward, Jr.
Attorney, Agent, or Firm—Mawhinney & Mawhinney & Connors

[57] ABSTRACT

A piston ring for use in a reciprocating internal combustion engine or in a compressor. The ring has an outer peripheral surface provided with a rotary finish machined curved center portion, rotary finished machined chamfer edges and a final finish plated wear-resistant coating evenly over the complete outer peripheral surface.

1 Claim, 1 Drawing Figure

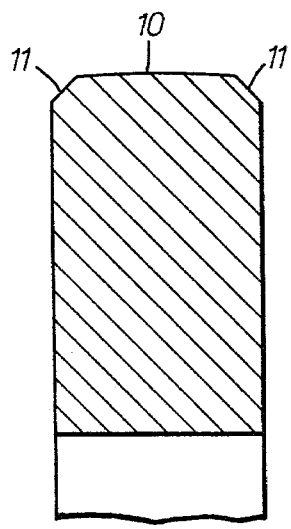

PISTON RING WITH WEAR RESISTANT COATING

This is a division, of application Ser. No. 012,820 filed Feb. 16, 1979, now abandoned.

This invention relates to piston rings and to methods for their manufacture, and in particular to such rings having on their outer peripheral surface a coating, for example a coating of chromium or of molybdenum.

Hitherto it has been the practice to machine the outer peripheral face of piston rings cylindrically, then to plate the peripheral surface for example with chromium and then to lap the outer peripheral surface so that the latter remains cylindrical, finally subjecting the ring to a short period of "barrel lapping".

In normal cylindrical lapping the ring is reciprocated in a cylinder coated with abrasive material, the axis of symmetry of the ring remaining parallel to the axis of the cylinder, whereby asperities on the surface of the ring are removed but the peripheral surface of the ring remains cylindrical. In barrel lapping the angle between the axis of symmetry of the piston ring and the axis of the abrasive cylinder is varied as the ring is reciprocated, so that the peripheral surface does not remain cylindrical but tends to become curved. In normal practice rings after being plated as described above are subjected to 5 minutes of cylindrical lapping followed by 2 minutes of barrel lapping.

According to the present invention in one aspect a method of manufacturing a piston ring includes the steps of machining the outer peripheral surface of the ring to be curved in cross-section, and subsequently coating the outer peripheral surface with a wear-resistant material. The invention also extends to a piston ring made by the above method.

According to the invention in another aspect, a piston ring for use in a reciprocating internal combustion engine or in a compressor has its outer peripheral surface coated with a wear-resistant material for use in the as-coated condition. The piston ring thus manufactured may either be installed in an engine without any further operation following the coating, or preferably it may be subjected to a short period, for example 2 minutes, of barrel lapping.

It will be seen that with the process of the invention the need for cylindrical lapping is eliminated and thus the time required and hence the cost of manufacture is reduced.

Two examples of the invention will now be described with reference to the accompanying FIGURE, which is a cross-section through part of a piston ring, illustrating the process according to the invention.

Referring to the FIGURE, in the first embodiment the piston ring is of 80 mm diameter and 1.5 mm thickness measured parallel to its axis of symmetry. The piston ring may be made for example of cast iron.

The major part of its outer peripheral surface is machined to be arcuate by means of a form tool. The radius of the arcuate surface in this case is 6 mm.

Where the outer surface joins the upper and lower side faces of the piston ring there are portions which make an angle of 35° with the side face. The axial extent of these portions may be 0.2 mm and the portions will have the sharp edge removed where they join the main arcuate portion of the peripheral surface.

After machining to this form, the peripheral face of the ring is then chromium plated.

The piston ring may then either be installed in an engine in the "as-plated" condition without any further operation or alternatively it may be subjected to a short period, for example 2 minutes, of barrel lapping. The latter is so arranged that the radius of the main part of the peripheral surface is greater than the radius to which the basic cast iron ring was machined, so that the greatest removal of metal occurs approximately half way between the upper and lower side faces. The amount of metal removed by the barrel lapping operation may be 0.02 mm, i.e. even at the position midway between the upper and lower faces of the ring where the maximum metal removal occurs only a small proportion of the thickness of the chromium coating is removed.

In a second embodiment, a similar piston ring is of 65 mm diameter. This ring has a thickness measured axially of the ring of 1.75 mm and the outer peripheral surface of the basic cast iron ring is machined by means of a form tool to have a radius of 9 mm over its main portion. At each edge of the peripheral surface there is a short sloping portion at an angle of 35° to the side face as described with reference to the first embodiment. This piston ring is then chromium plated, and again may be used in the engine without any further operation or may be given a short period of barrel lapping so that a small amount e.g. approximately 0.02 mm of the chromium coating is removed at a point midway between the upper and lower side faces.

The main portion of the peripheral surface of the basic cast iron ring before chromium plating may have the form of a single arc of a circle as described above, or alternatively may have the form of two arcs of smaller radius interconnected by a central cylindrical portion.

Where the main portion of the peripheral surface is in the form of a single arc, the radius of this is not critical but in general increases as the thickness (measured parallel to the axis of symmetry) of the ring is increased. For example, a ring having a thickness of 2.5 mm or more may have a radius of 23 mm.

For rings up to 2 mm thick, the radius of the peripheral surface should be between 5 mm and 20 mm; for piston rings greater than 2 mm thick the radius is preferably between 10 mm and 60 mm, depending on the diameter and thickness of the ring.

The peripheral surface near the upper and lower side faces of the ring may have small areas of relatively rough chromium.

An engine having top piston rings installed in the "as-plated" condition as described above with reference to the first embodiment was tested for 23 hours on the following cycle:- 3 hours running in; 3 hours at 4000 r.p.m. full power; 17 hours repeating the cycle of 8 minutes at 6000 r.p.m. full throttle, 1 minute at 4000 r.p.m. half throttle.

On conclusion of the test it was found that the peripheral face of each of the piston rings had a satisfactory and constant form when measured on a Talysurf machine, both near the gap and opposite the gap. The gap had increased by an average of 0.1 mm and the average wear of the chromium was 0.01 mm.

The machined form of the basic cast iron ring need not necessarily be symmetrical.

When the rings are used in the engine in the "as coated" condition, without any further operation, the gap between the free ends of the ring on initial assembly should be reduced slightly, for example by 0.1 mm, to compensate for the initial wear of the chromium which occurs during the bedding-in process.

According to the invention in another aspect, a piston ring is chromium plated and installed without any surface finishing operation. In such non-finished condition, the ring will have a surface roughness on the order of 0.4 to 0.8 micro-meters Ra.

The illustration shows a cross-section through a ring in accordance with the invention, on one end of a diameter of the ring. The outer peripheral face 10 of the ring is in the form of an arc of a circle, as described in respect of the two embodiments. Moreover there are chamfered portions 11 at the junction of the outer peripheral surface and the upper and lower side faces. The thickness of the chromium might be 0.8 to 1.2 mm.

I claim:

1. A piston ring for use in a reciprocating internal combustion engine or in a compressor, said ring having an outer peripheral surface provided with a rotary finish machined curved center portion, rotary finish machined chamfer edges and a final finish plated wear-resistant coating evenly over the complete outer peripheral surface.

* * * * *